July 6, 1965
R. L. MALOBICKY ET AL
3,193,370
APPARATUS FOR BENDING GLASS SHEET
Filed May 1, 1961
2 Sheets-Sheet 1
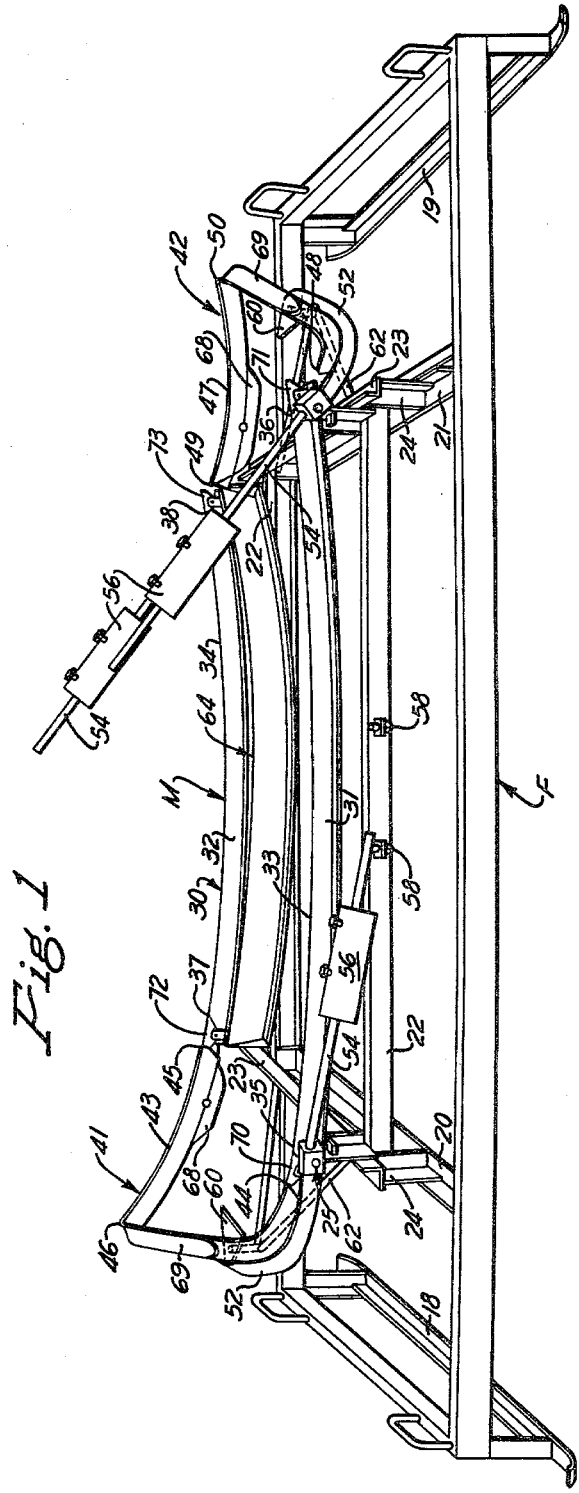
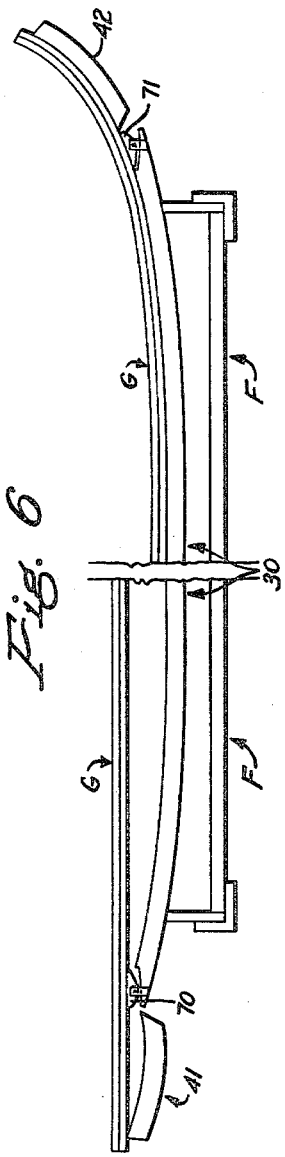
INVENTORS
RUDOLPH L. MALOBICKY and
STEPHEN J. D. JURSA
BY
Oscar L Spencer
ATTORNEY United States Patent Office 3,193,370
Patented July 6, 1965

3,193,370
APPARATUS FOR BENDING GLASS SHEET
Rudolph L. Malobicky, Tarentum, and Stephen J. D. Jursa, Springdale, Pa., assignors to Pittsburgh Plate Glass Company, Pittsburgh, Pa., a corporation of Pennsylvania
Filed May 1, 1961, Ser. No. 106,926
6 Claims. (Cl. 65—299)

This application relates to improvements in treating glass and particularly concerns improvements in molds for bending glass sheets to bending curves of varying radius including a relatively gently bent central portion merging into flanking regions that are sharply bent.

In bending glass sheets to such complex bending curves, bending techniques have been developed which involve the use of sectionalized molds of skeleton configuration conforming in elevation and outline to the shape of the curved glass sheet. The most effective molds of this type are concave in elevation and include a rigid, central molding member comprising spaced, stainless steel shaping rails of concave elevation extending lengthwise of the mold, flanked by pivotable wing members, each comprising a concavely curved, stainless steel rail extending longitudinally outwardly from adjacent a longitudinal extremity of one of said shaping rails around a longitudinal extremity of the mold and then longitudinally inwardly thereof toward the longitudinal extremity of the other shaping rail comprising the central molding member.

The wing members rotate into a spread mold position to support a flat glass sheet as a beam adjacent its longitudinal extremities and at some intermediate point or points, preferably the ends of the center molding member rails. The wing members are preferably counterweighted to rotate upwardly.

In the past, the flat glass sheets have been supported at their longitudinal extremities on the outer longitudinal extremities of the concavely shaped wing members and intermediate their extremities on the longitudinal extremities of the concavely shaped shaping rails. The intermediate supports for the flat glass sheets have been in the form of thin pointed lines extending across the shaping rail thickness at each shaping rail extremity. Since the length of the glass sheet is reduced as it changes its shape from a flat to a curved configuration, the portions of the flat glass sheet resting on the ends of the center section rails slide along the shaping surface and become marked as a result of the sliding contact between the undersurface of the flat glass sheet and the pointed longitudinal extremities of the shaping rails. Also, the supported portions of the glass sheet tend to become kinked over the sharp supporting edges of the rail ends. This latter phenomenon is especially true when the intermediate support points traverse the bending zone near the high temperature regions of the bending zone. The tendency for the glass to kink at the intermediate support points was intensified because the pressure at the points of intermediate support was very high as the mass of the glass sheet was supported on very small areas. Therefore, the pointed extremities of the shaping rails of the mold center section penetrated the bottom surface of the supported heat-softened glass sheet.

This marking and kinking was avoided to some extent by attaching weights of sufficient mass to counterweight the wing members to lift the glass sheets entirely off the intermediate support points as soon as the glass began to soften. However, the latter solution tended to increase the occurrence of "sliders," a term used in the art to describe the phenomenon when a glass sheet is displaced longitudinally of the mold as a result of lifting one of its longitudinal extremities before its other longitudinal extremity, a factor that occurs with greater frequency as larger counterweights are employed. When the glass sheet is displaced along its longitudinal axis, it is bent out of symmetry with respect to its transverse central axis and the glass sheet cannot be installed properly within a curved automotive glazing frame.

Before the present invention, a large number of bent glass sheets had to be scrapped because of excessive marking in the vicinity of the intermediate support points. Until the advent of the present invention, these losses were accepted as inherent in commercial bending operations.

According to the present invention, a shaping rail segment having an upper edge surface that conforms to a substantially flat portion of the outline shaping surface of the mold is located intermediate each longitudinal extremity of each shaping rail that comprises the center mold section and an adjacent longitudinal inner extremity of a wing section. Each shaping rail segment is free from pivotal attachment at its ends. Instead, it is pivotally attached to the mold intermediate its longitudinal ends, and is disposed so that its upper edge surface is pivotable into a position in a plane common with the plane occupied by the longitudinally outer extremity of each of the wing members when the wing members are pivoted into a spread mold position to support a rigid flat glass sheet for bending to provide four areas of support for the rigid flat glass sheet intermediate its longitudinal extremities. Each shaping rail segment is also pivotable into another position where its upper edge surface extends along the outline shaping surface of the mold substantially the entire distance from one longitudinal extremity of one of the laterally spaced shaping rails of the center mold section to an inner longitudinal extremity of one of the wing members.

Each pivotable shaping rail segment is relatively short compared to the length of the center section shaping rails and of the wing members and has a relatively small mass compared to that of the supported portion of the glass sheet to enable it to pivot easily in response to rotation of the supported glass sheet portion. Its small mass insures that its thermal capacity has a minor effect on the temperature of the portion of the glass sheet it contacts. However, the area of support each segment provides for the flat glass sheet is substantially greater than that of the longitudinal extremity of the shaping rail that formerly served as one of the intermediate support members for the flat glass. This increase in area of support provided by the present invention reduces the pressure that causes dimpling of the glass sheet at its regions of intermediate support.

In a particular embodiment of the present invention, the shaping rail segments are pivotally attached to the mold by means of trunnion support means fixed at one extremity to a longitudinal extremity portion of each center mold section shaping rail beneath its upper edge. The trunnion means has a hinge element adjacent its free upper end. A cooperating hinge element operatively connected to the shaping rail segment and pivotally attached to the hinge element adjacent the free end of the trunnion means cooperates to provide the pivot action between the shaping rail segment and the center mold section rail.

In a preferred embodiment of the present invention, the cooperating hinge elements are located below the shaping surface and between the longitudinal ends of their pivotally supported shaping rail segment. In addition, the center of gravity of each shaping rail segment is located longitudinally inwardly of the mold relative to the cooperative hinge element so as to have the shaping rail segment tend to rotate into a position adjacent to the longitudinal extremity of the adjacent shaping rail of the center mold section. Each center section shaping rail has a recessed wall in each of its longitudinal extremity portions to provide clearance for a shaping rail segment. This clearance permits the shaping rail segment to rotate freely.

Each shaping rail segment is provided with a lower wall along the longitudinally inner portion thereof. Abutment means are attached to the lower wall for contact with a portion of the recessed wall of the longitudinal extremity portion of each center section shaping rail in order to insure that the shaping rail segment assumes the proper position in the closed mold position.

The axis about which the shaping rail segment rotates is preferably located in such a position that the longitudinally inner end of the shaping surface rotates in an arcuate path that follows as closely as possible the path taken by the flat glass sheet portion supported thereon as the glass sheet sags into conformity with the mold shaping surface. This reduces marks on the glass sheet resulting from sliding to a minimum.

The present invention will be understood better after reading a description of a particular embodiment thereof which follows. In the drawings forming part of the description of the illustrative embodiment, wherein like reference numerals refer to identical structural elements throughout.

FIG. 1 is a perspective view of a bending mold incorporating the present invention, showing one half of the bending mold in the open mold position and the other half in the closed mold position.

FIG. 6 is an enlarged schematic elevational view showing how the shaping rail segment forming part of the present invention is associated with a sectionalized mold in the open mold position to the left and the closed mold position to the right with conventional mold structure and the central portion of the mold omitted to depict the present invention more clearly.

Figure 2:
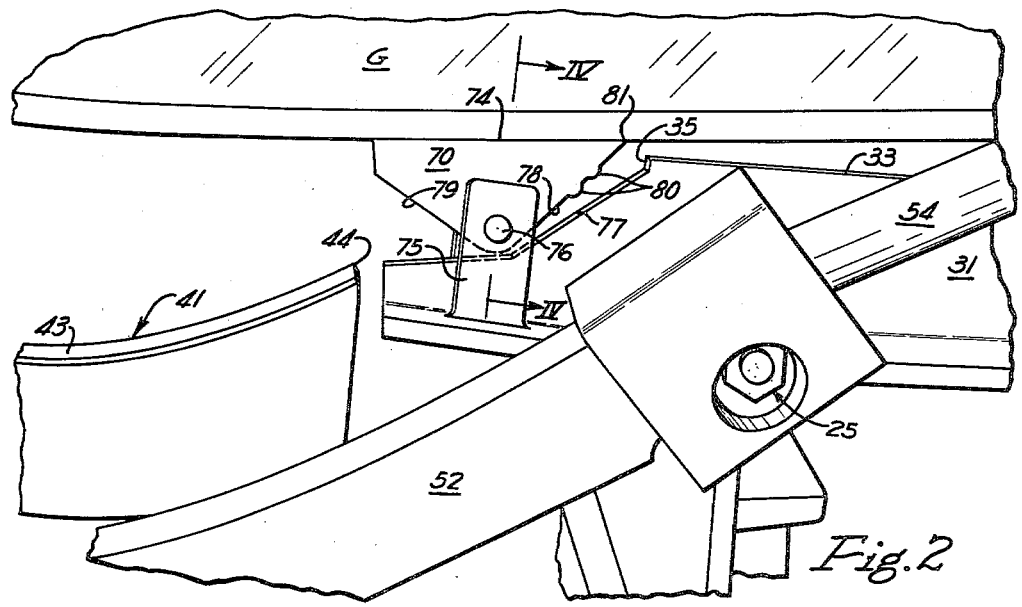
FIG. 2 is an enlarged perspective view of a shaping rail section showing adjacent rail portions of a typical mold center section shaping rail and wing member in the open position supporting a flat glass sheet for bending.

Referring to the drawings, particularly FIG. 1, M refers to a sectionalized bending mold according to the present invention. The mold is carried upon a support frame F. The latter comprises a pair of transverse runners 18 and 19. Runners 18 and 19 ride along the rolls of a stub roll conveyor (not shown) which conveys the frame F and its supported mold M through a bending lehr (not shown).

Additional cross beams 20 and 21 interconnect the longitudinally extending side frame members 10 and 11 intermediate the extremities thereof and are located slightly inwardly of the sharp axis of curvature defined by the shaping surface of the members comprising the mold M. Additional longitudinal beams 22 and additional transverse beams 23 form a superstructure in a plane above the plane occupied by the mold frame. Four vertically extending members 24 provide a connection between each corner of the superstructure 22, 23 and the base frame and support four knife-edge bearings 25.

Each of four knife-edge bearings 25 is of the type described and claimed in application Serial No. 833,778 of Harold E. McKelvey, filed August 14, 1959, for Improved Glass Sheet Bending Apparatus.

The center mold section 30 comprises a pair of laterally spaced center section rails 31 and 32. Rail 31 has an upper edge 33 of relatively shallow curvature and rail 32 has an upper edge 34, also of relatively shallow curvature. The center section shaping rails 31 and 32 are of concave elevation and extend along the central portion of the laterally opposite longitudinally extending side edges of the mold to provide the central portion of an outline shaping surface. Reference numbers 35 and 36 depict the longitudinal extremities of upper edge 33, while reference numbers 37 and 38 are applied to the longitudinal extremities of upper edge 34. The four knife-edge bearings are located slightly longitudinally inwardly of longitudinal extremities 35, 36, 37, and 38, respectively, and below the upper edges 33 and 34, respectively.

Wing members 41 and 42 are located beyond each longitudinal extremity of the center mold section. Wing member 41 is a substantially V-shaped rail disposed edgewise with an upper edge surface 43 providing the shape of one longitudinal extremity of the outline shaping surface. Wing member 41 extends from one inner longitudinal extremity 44 adjacent to but spaced from the longitudinal extremity 35 of upper edge 33 to its other inner longitudinal extremity 45 which is located adjacent to but spaced from the longitudinal extremity 37 of upper edge 34 and extends continuously about an enclosed longitudinal outer extremity 46. Similarly wing member 42 has an upper edge surface 47 that conforms to the opposite extremity of the mold shaping surface and extends continuously from one inner longitudinal extremity 48 adjacent to but spaced from longitudinal extremity 36 of upper edge 33 to its other longitudinal inner extremity 49 adjacent to but spaced from longitudinal extremity 38 of upper edge 34 about an outer longitudinal extremity 50. The upper edge surfaces 43 and 47 are sharply bent adjacent their longitudinal inner extremities.

A metal strap 52 is attached at its longitudinally outer end portion to the bottom edge of each of the wing members 41 and 42. The longitudinally inner end portion of each metal strap 52 is secured to a weighted arm 54 through a pivotable element of one of the knife-edge bearings 25. The weighted arms 54 extend longitudinally inwardly of the mold laterally outwardly of the center mold section and contain one or more weights 56 adjacent their longitudinally inner end portion. Conventional stop members 58 comprising adjustable set screws are located in the plane of rotation of the longitudinal inner extremity of each of the weighted arms 54. When the weighted arms 54 contact the upper surface of the stop members 58, further rotation of the wing members 41 and 42 is prevented.

Two stop members are shown mounted on the front longitudinal beam 22 shown in FIG. 1. An additional pair of stop members are mounted on the rear longitudinal beam 22 but are incapable of being seen in the view depicted in FIG. 1.

Conventional heat absorber members 60 are located beneath the area enclosed by the outer portion of the wing members 40 and 42. The latter are attached by support rods 62 to the intermediate cross beams 20 and 21.

An additional conventional heat absorber member 64 is supported by the frame adjacent rail 32. Additional metal heat absorber members 68 are attached along one side of the wing members 41 and 42 and are located along the side adjacent center section shaping rail 32 to cooperate with heat absorber member 64 in maintaining the side edge of the glass sheet ultimately supported on shaping rail 32 relatively free from transverse bending whereas the other side edge of the glass sheet ultimately supported on center section shaping rail 31 is free to soften and develop a transverse sag. This technique for producing a compound bend does not form part of my present invention and is merely incorporated in the present disclosure to provide a full description of an illustrative embodiment incorporating the present invention.

The improvement the present invention provides over the prior art is in the shaping rail segments 70, 71, 72, and 73 located longitudinally inwardly of the sharply bent regions of the shaping surface at the maximum possible longitudinal distance from the center of the mold wherein the glass sheet is gently bent. These shaping rail segments are provided with upper edges 74. The length of each shaping rail segment is on the order of two inches. This length provides an area of support substantially greater than that of the prior art and is the maximum length permissible for the segment without causing the shape of the upper edge to depart substantially from a flat plane. For rails ⅛ inch thick, the support area is .250 sq. in. compared to a few thousandths of a square inch of support at each shaping rail extremity in the prior art. The total mass of each segment is only a few ounces, which minimizes the effect of the heat capacity of the segments on the stress induced in the supported glass sheet portions during the thermal cycle that accompanies the bending operation.

Figure 3:
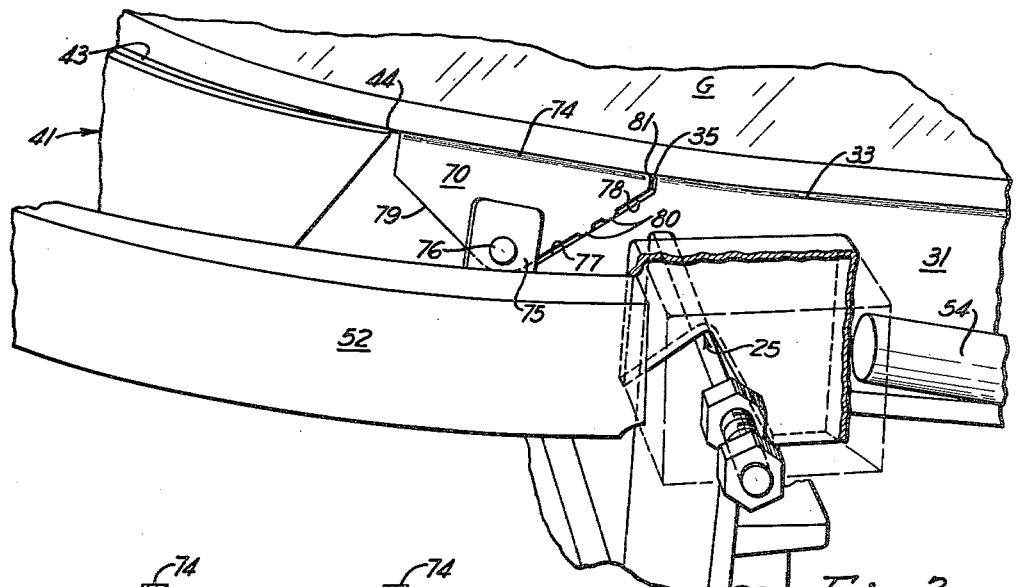
FIG. 3 is a perspective view of the same elements showing them in the closed mold position supporting a portion of a curved glass sheet after bending with parts broken away to show certain constructional details.
Figure 4:
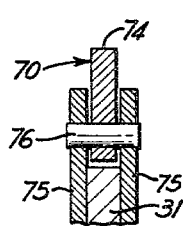
FIG. 4 and FIG. 5 are sectional views of two alternate embodiments of pivots for securing shaping rail segments to the longitudinal extremity portion of the center section shaping rail and are taken along the line IV—IV of FIG. 2.

In order to understand the present invention more fully, the reader's attention is invited to FIGS. 6, 2 and 3. Trunnion support means in the form of a pair of plates 75 are secured to the opposite faces of a center section shaping rail 31 or 32 adjacent its longitudinal extremities and extend upwardly therefrom. Hinge means, which may comprise a pivot pin 76 extending through aligned apertures in the two plates 75 and an aperture through the shaping rail segment 70, 71, 72, or 73, are provided to enable the shaping rail segments to rotate independently of one another and in response to the sagging of the supported glass sheet from a flat configuration to a shaped configuration.

The aperture through each shaping rail segment 70, 71, 72, or 73 is disposed below the shaping surface 74 and between the longitudinal ends of the pivotally supported shaping rail segment. The location of the aperture determines the location of the pivot means about which the shaping rail segment is pivoted.

In order to provide clearance for rotation of the shaping rail segments 70–73, inclusive, about their respective hinge means 76, each longitudinal end portion of each of the center section shaping rails 31 or 32 is provided with a downwardly extending recessed wall 77 located longitudinally outwardly of each longitudinal extremity of its upper edge. The shaping rail segments 70 to 73 are each provided with an oblique inner lower wall 78 and an oblique outer lower wall 79. Abutment means 80 are provided on the oblique inner lower wall 78 to contact wall 77 at the end portion of a center section shaping rail 31 or 32 to limit the inward rotation of the shaping rail segment when the latter rotates so that the longitudinally inner edge 81 of its upper surface 74 moves into proper alignment in end-to-end relation with an adjacent longitudinal extremity such as 35 of upper edge 33 of shaping rail 31. Similar constructions are provided on the other shaping rail segments 71, 72, and 73.

Figure 5:
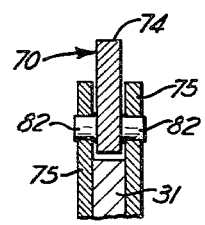

FIG. 5 shows an alternate embodiment of a shaping rail segment in which the cradle support means 75 are provided with aligned apertures to receive aligned trunnion-like members 82 which are rigidly secured to the opposite surfaces of the shaping rail segments and thereby make it possible for the shaping rail segments to pivot freely relative to the cradle support means 75 provided by the plate rigidly secured to each longitudinal extremity of each center section shaping rail.

It is possible to locate the hinge means 76 about which the shaping rail segments pivot in any location relative to the center of gravity of the shaping rail segment. However, it has been found desirable to provide a small net force for the segments to tend to pivot the latter into the closed mold position. Therefore, it is desirable to locate the hinge means about which the shaping rail segments pivot so that the center of gravity of the shaping rail segment is located longitudinally inwardly relative to the hinge means and particularly desirable to locate the hinge means in such a location that the arc traversed by the inner end 81 of each upper surface 74 when the segments move from the open to the closed mold position approximates as closely as possible the movement of the portion of the flat glass sheet supported thereon as the glass bends so as to reduce sliding between the glass and the metal surfaces to a minimum.

When one or more flat glass sheets are mounted on the mold for bending, the mass of the glass rotates each relatively light segment so that its upper surfaces 74 pivots into a horizontal plane to support the flat glass intermediate its extremities as shown in FIG. 2. As the glass sheet softens upon being heated, its central portion sags downwardly toward upper edges 33 and 34 of center section shaping rails 31 and 32 while the longitudinal ends of the glass sheet are rotated upwardly in response to the upward rotation of the wing members 41 and 42. The portions of the glass sheet initially resting on the upper surfaces 74 of the shaping rail segments 70–73, inclusive, rotate and move inwardly as the center portion of the glass sheet becomes shortened on sagging. The freely pivotable segments 70–73 rotate about hinge means 76 or 82 in response to the downward and longitudinally inward movement of the supported glass portions as the mold assumes the closed mold position.

There is substantially no relative movement between the intermediately supported glass portions and their support elements as the glass is shaped. This lack of relative movement between the supported intermediate portions of the glass and the shaping rail segments during the glass sagging operation compared to the prior art type of support has substantially eliminated the marks that appeared on the glass portions due to relative sliding on prior art supports.

Increasing the area of supporting surface for the glass portions has reduced kinking to the point where it is no longer the considerable cause for rejects that it was previously and also reduced the incidence of misalignment of glass sheets because of their longitudinal displacement relative to the mold during bending.

In the closed position depicted in FIG. 3, the upper surface 74 of shaping rail segment 70 extends substantially the entire distance between the longitudinally inner extremity 44 of upper edge 43 of wing member 41 and extremity 35 of upper edge 33 of center section rail 31. Shaping rail segment 71 bridges the gap between extremities 48 and 36, while segments 72 and 73 perform a like function for the gaps between extremities 45 and 37 and 49 and 38, respectively. Segments 70–73 form part of the outline shaping surface of the mold.

Many variations within the inventive concept will become obvious in the light of the foregoing description. The embodiments described above have been for the purpose of illustration rather than limitation. Reference to the latter may be obtained from the claimed subject matter which follows.

What is claimed is:

1. In a sectionalized, skeletonized mold for bending glass sheets having an outline shaping surface of concave elevation comprising a center mold section including a pair of laterally spaced shaping rails having upper shaping surfaces of concave elevation extending along the central portion of the laterally opposite, longitudinally extending, side edges of said outline shaping surface and further including wing members having upper shaping surfaces of concave elevation and having inner and outer longitudinal extremities, means on said mold for pivotally attaching each wing member relative thereto for pivotal movement between a spread mold position and a closed mold position, wherein said outer longitudinal extremities of said wing members occupy a common plane when the wing members are pivoted into said spread position and the upper shaping surface of said shaping rails and the upper shaping surfaces of said wing members form different portions of said outline shaping surface of concave elevation when said wing members are pivoted into the closed mold position, the improvement comprising a shaping rail segment, having a relatively short length compared to the length of said shaping rails and of said wing members, located beyond each longitudinal extremity of said upper edge of each of said pair of shaping rails comprising said center mold section and inwardly of an inner longitudinal extremity of each of said wing members, means pivotally attaching each said shaping rail segments to said mold, each shaping rail segment having an upper edge surface and being free from pivotal attachment at its ends, said pivot means being disposed below the upper edge surface and between the longitudinal ends of one of said shaping rail segments so that the upper edge surface of its associated shaping rail segment is pivotable into a position in said common plane occupied by said outer longitudinal extremities of said wing members in said spread mold position to provide one of four supports for said rigid flat glass sheet intermediate its longitudinal ends, and its said upper edge surface extends along said outline shaping surface substantially the entire distance from one longitudinal extremity of said upper shaping surface of one of said laterally spaced shaping rails to an inner longitudinal extremity of the upper shaping surface of one of said wing members when the wing members are pivoted into the closed mold position.

2. The improvement according to claim 1, wherein the upper shaping surfaces of said center section rails are of relatively shallow curvature and the upper shaping surfaces of said wing members include a sharply bent portion and each said shaping rail segment is located closely adjacent one of said sharply bent portions.

3. The improvement according to claim 1, wherein the center of gravity of said shaping rail segment is located longitudinally inwardly of said mold relative to said means pivotally attaching said shaping rail segment to said mold.

4. The improvement according to claim 1, wherein each longitudinal extremity portion of each center section shaping rail has a longitudinally outwardly and downwardly extending recessed wall to provide clearance for one of said shaping rail segments and each said shaping rail segment is provided with an oblique, lower inner wall and abutment means attached to said lower wall for contact with a portion of said recessed wall.

5. The improvement according to claim 1, wherein said means pivotally attaching each said shaping rail segment to said mold is so located that the upper edge of said shaping rail segment pivots in a path that substantially corresponds to the path taken during a bending operation by a glass sheet portion supported thereon.

6. The improvement as in claim 1, wherein said means for pivotally attaching each said shaping rail segment to said mold comprises trunnion support means fixed at one extremity to a longitudinal extremity portion of each said center mold section shaping rail beneath its upper edge, a hinge element adjacent the free end of said trunnion means and a cooperating hinge element operatively connected to said shaping rail segment and pivotally attached to said hinge element adjacent the free end of said trunnion means.

References Cited by the Examiner
UNITED STATES PATENTS

| | | | |
|---|---|---|---|
| 2,551,607 | 5/51 | Jendrisak | 65—291 |
| 2,737,758 | 3/56 | Jendrisak | 65—290 |
| 2,774,189 | 12/56 | Jendrisak | 65—290 |
| 2,814,164 | 11/57 | Carson et al. | 65—290 |
| 2,925,688 | 2/60 | Carson | 65—290 |

DONALL H. SYLVESTER, *Primary Examiner.*